United States Patent
Keser

(10) Patent No.: US 7,320,714 B2
(45) Date of Patent: Jan. 22, 2008

(54) HIGH SURFACE AREA POROUS ALUMINUM ELECTRODE IN ELECTROLYTIC CAPACITORS USING SOLID FREEFORM FABRICATION

(75) Inventor: Milan Keser, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/888,293

(22) Filed: Jul. 8, 2004

(65) Prior Publication Data

US 2004/0246659 A1 Dec. 9, 2004

Related U.S. Application Data

(62) Division of application No. 09/961,475, filed on Sep. 24, 2001, now Pat. No. 6,785,123.

(51) Int. Cl.
*H01G 9/00* (2006.01)

(52) U.S. Cl. .................................. 29/25.03; 361/509

(58) Field of Classification Search .............. 29/25.03; 75/228, 249, 745, 751; 361/509–528
See application file for complete search history.

(56) References Cited

U.S. PATENT DOCUMENTS

| | | | |
|---|---|---|---|
| 4,692,387 A * | 9/1987 | Reich .......................... | 428/545 |
| 5,203,944 A * | 4/1993 | Prinz et al. .................. | 156/247 |
| 6,117,612 A * | 9/2000 | Halloran et al. ............ | 430/269 |
| 6,351,371 B1 * | 2/2002 | Yoshida et al. ............. | 361/528 |
| 6,426,864 B1 * | 7/2002 | O'Phelan et al. ........... | 361/509 |
| 6,670,222 B1 * | 12/2003 | Brodsky ..................... | 438/118 |

* cited by examiner

*Primary Examiner*—H. Jey Tsai
(74) *Attorney, Agent, or Firm*—Blakely, Sokoloff, Taylor & Zafman LLP

(57) ABSTRACT

A porous aluminum anode is used in a capacitor. The porous anode is constructed by a solid freeform fabrication (SFF) process and has a plurality of pores. Each of the plurality of pores has a pore size. An electrolyte is infiltrated in the plurality of pores. An oxide layer is formed on the aluminum surface to provide a dielectric for the capacitor.

9 Claims, 4 Drawing Sheets

HIGH SURFACE AREA POROUS ALUMINUM ELECTRODE IN ELECTROLYTIC CAPACITORS USING SOLID FREEFORM FABRICATION

CROSS-REFERENCES TO RELATED APPLICATIONS

This is a Divisional Application of U.S. patent application Ser. No. 09/961,475, filed Sep. 24, 2001, now U.S. Pat. No. 6,785,123. This Divisional Application claims the benefit of the U.S. patent application Ser. No. 09/961,475.

BACKGROUND

1. Field of the Invention

This invention relates to capacitors. In particular, the invention relates to aluminum electrolytic capacitors.

2. Description of Related Art

Aluminum capacitors are popular in many applications due to low cost, versatility, high working voltages. They are useful in applications such as power supply filtering, low noise audio applications, and memory back-up. A capacitor typically consists of anode and cathode plates and a dielectric. The capacitance of a capacitor is directly related to the surface area of the anode and cathode plates. It is desirable to have a large surface area without increasing physical space for a given forming voltage and dielectric thickness.

Existing techniques to increase the surface area of an anode plate or foil include electrochemical etching. The etching roughens the surface of the foil and can increase the surface area hundred-fold. However, etching requires careful consideration. In addition, although the increase in surface area is large, it is still desirable to have even higher gain in surface area.

Therefore, there is a need to have a large surface area for the electrodes in capacitors.

BRIEF DESCRIPTION OF THE DRAWINGS

The features and advantages of the present invention will become apparent from the following detailed description of the present invention in which.

DESCRIPTION

The present invention is a technique to increase the surface area of the aluminum anode in electrolytic capacitors. The technique includes construction of the aluminum electrode with a well-defined porous microstructure having a large number of pores. The construction use solid freeform fabrication methods which have a high degree of control over microstructure.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
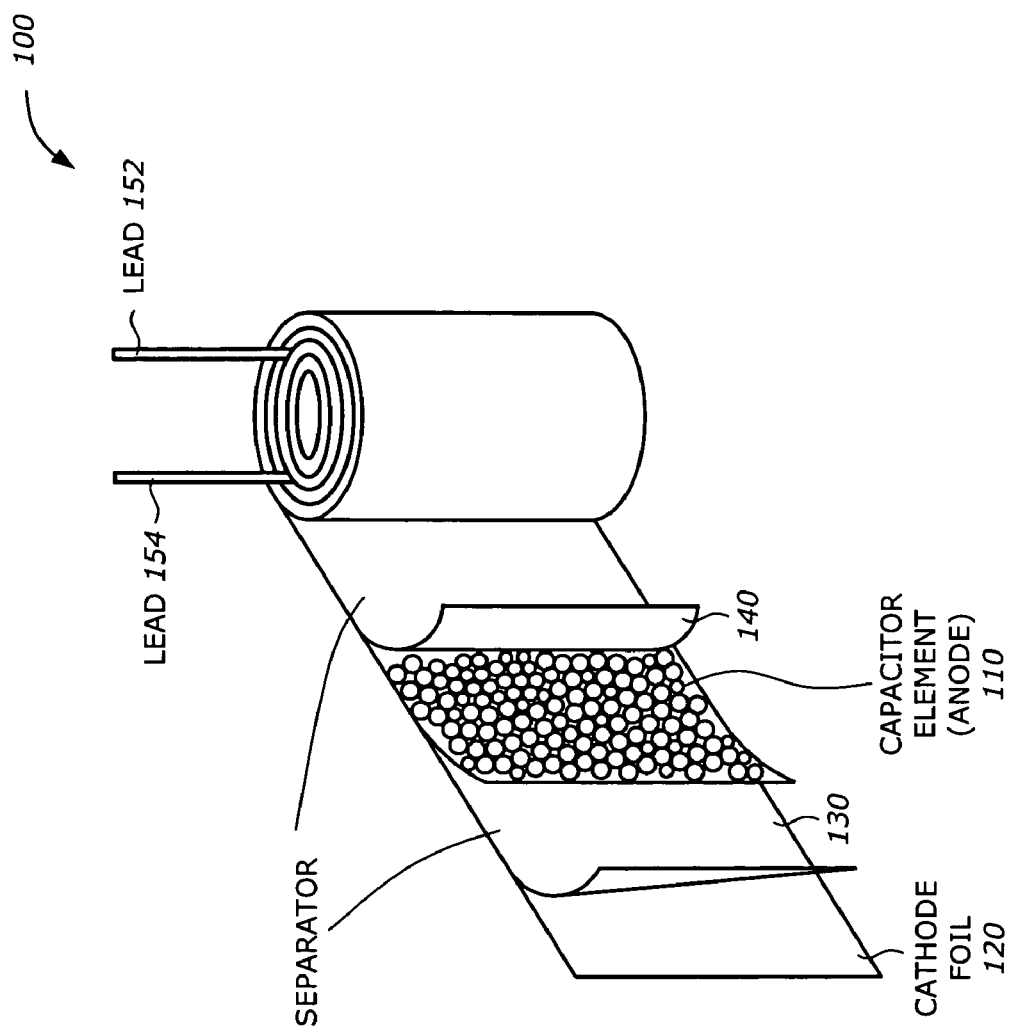
FIG. 1 is a diagram illustrating a capacitor in which one embodiment of the invention can be practiced.

FIG. 1 is a diagram illustrating a capacitor 100 in which one embodiment of the invention can be practiced. The capacitor 100 includes a capacitor element 110, a cathode foil 120, two separators 130 and 140, and two leads 152 and 154.

The capacitor 100 may have a capacitance from less than 1 µF to greater than 1 farad. The capacitor 100 may be used in line-frequency power supply filtering, switching power supply filtering, audio direct current (DC) blocking, or in other low equivalent series resistance (ESR), low noise, and high temperature environments. The capacitor 100 is any wound-type capacitor such as aluminum electrolytic, aluminum type capacitor with an organic semi-conductive type electrolyte (OS-CON), and aluminum polymer.

The capacitor element 110 provides an anode electrode for the capacitor 100 and has a porous aluminum foil. The capacitor element 110 will be described in FIG. 2. The cathode foil 120 is an aluminum foil to provide cathode contact for the capacitor 100. Typically the cathode foil 120 is not etched, nor does it have a porous surface. The separators 130 and 140 separate the cathode foil 120 and the capacitor element 110 and are typically papers. The capacitor element 110 and the cathode foils 120 are wound into a cylinder to form the core of the capacitor 100. An outer case encloses the cylinder. The two termination elements, or tabs, 152 and 154 are attached to the foils 110 and 120 to provide terminal connections.

The dimensions of the capacitor 100 may vary greatly. The height may range from a few millimeters (mm) (e.g., 3.5 mm) to several inches. The dimensions of the leads 152 and 154 depend on the dimensions of the capacitor 100. The material for the leads 152 and 154 may be any conductive material such as tin, lead-containing tin on copper clad steel, silver plated on copper clad steel, bismuth-tin (Bi-Sn) plating on copper clad steel (lead free) and Bi-Sn plating on copper (lead free).

Figure 2:
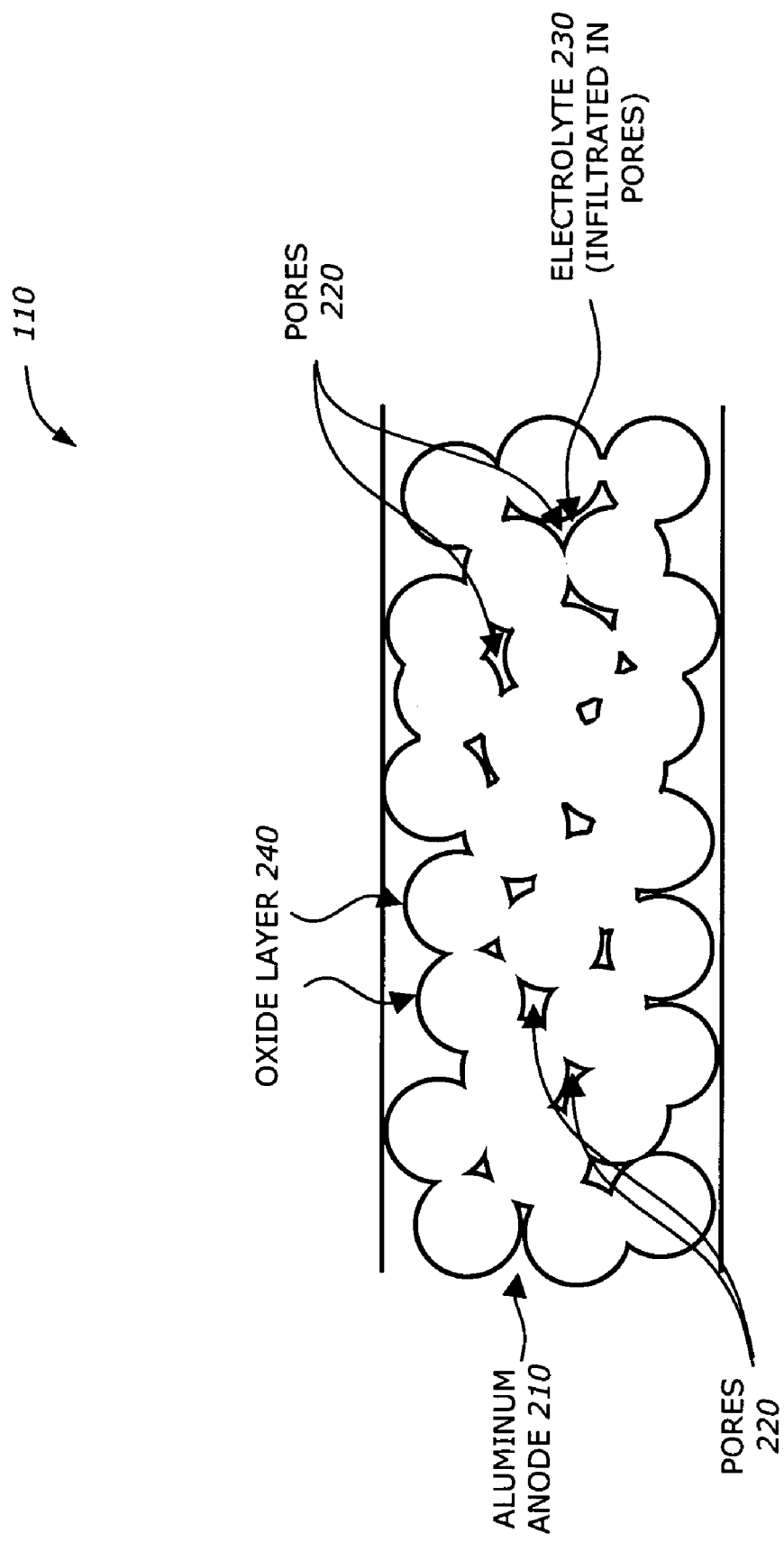
FIG. 2 is a diagram illustrating a capacitor element shown in FIG. 1 according to one embodiment of the invention.

FIG. 2 is a diagram illustrating the capacitor element 110 shown in FIG. 1 according to one embodiment of the invention. The capacitor element 110 includes a porous aluminum anode 210, an electrolyte 230 and an oxide layer 240.

The porous aluminum anode 210 is highly porous to provide a high surface area electrode for the capacitor 100 (FIG. 1). The porous aluminum anode 210 is constructed by a solid freeform fabrication (SFF) process and has a porous volume. The porous aluminum anode 210 is populated by a number of pores 220. Each of the pores 220 has a pore size d. Typically, the pores have fine structure with similar pore sizes. The size d of the pore may be controlled during the SFF process to achieve the desired surface area. Small pores lead to higher surface area but may present difficulty for electrolyte infiltration. Large pores provide lower surface area but may facilitate electrolyte infiltration. The size d is typically less than approximately ten µm.

Typical etching of an aluminum foil may result in a surface area magnification of about a hundred times. Creation of a porous aluminum electrode of roughly the same size may potentially lead to an further area increase beyond what etching provides as shown in Table I. Table I shows the surface area increase as a function of the pore size or particle size. The calculations assume cubic packing of spherical aluminum particles into the electrode volume, and that approximately 25% of the surface areas of those spheres are in contact with each other and therefore are not available for oxidation. These assumptions are conservative and tend to show the lower bounds of the increase.

TABLE I

| Pore Size | Surface Area Increase Beyond Etching |
|---|---|
| 0.5 µm | 78 times |
| 1 µm | 39 times |
| 5 µm | 7.8 times |

The electrolyte 230 is infiltrated or impregnated in the pores 220 using techniques used for etched aluminum foil. The electrolyte 230 may be $MnO_2$, salt-type electrolyte, or conducting polymer. Filling the pores 220 with electrolyte may require some process optimization related to viscosity control, number of dips, and seep time, etc.

The oxide layer 240 is formed on the porous aluminum anode 210 to provide a dielectric for the capacitor 100. The oxide layer 240 may be created using standard oxidation or anodization methods used for the etched foil. The thickness of the aluminum oxide layer 240 can be controlled by the duration of oxidation or by the anodization voltage. Thinner layer gives higher capacitance but may be more susceptible to mechanical damage and have lower rated voltage. Thicker layers are more robust and have higher voltage rating, but provide a lower capacitance. For applications requiring a few volts, the thickness of the oxide layer 240 may range in the hundreds of Angstroms.

Figure 3:
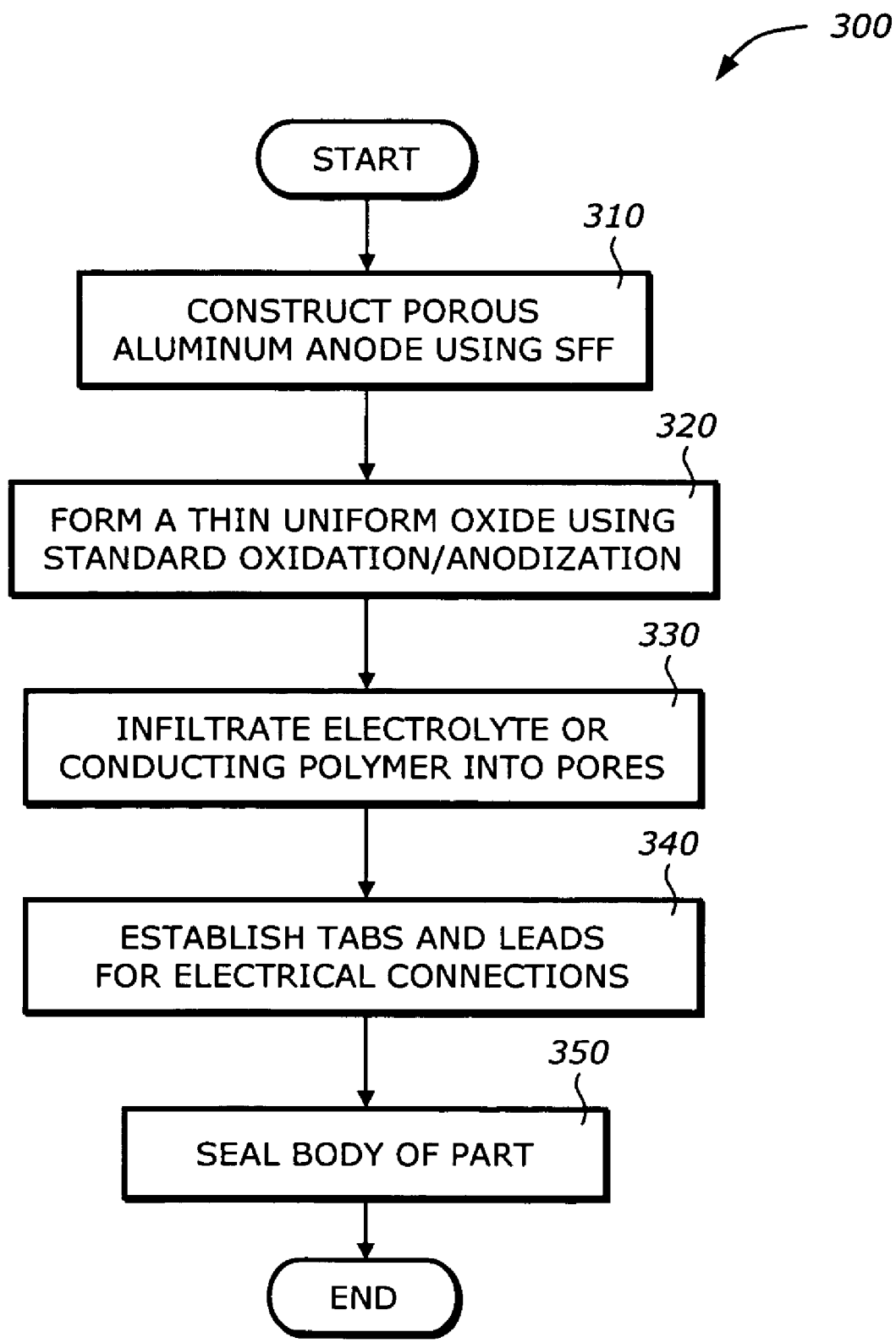
FIG. 3 is a flowchart illustrating a process to fabricate the capacitor according to one embodiment of the invention.

FIG. 3 is a flowchart illustrating a process 300 to fabricate the capacitor according to one embodiment of the invention.

Upon START, the process 300 constructs or fabricates the porous aluminum anode using a SFF process (Block 310). The pore density, the pore pattern, and the pore size are controlled during the SFF process by adjusting control parameters. Next, the process 300 forms a thin uniform oxide on the porous surface of the aluminum using standard oxidation or anodization (Block 320).

Then, the process 300 infiltrates electrolyte or conducting polymer into the pores (Block 330). The infiltration process is typically the same as the standard method used for traditional etched foil. Next, the process 300 establishes tabs and leads for electrical connections (Block 340). Then, the process 300 seals the body of the parts by encasing with an outer case or other sealing structures (Block 350). The process 300 is then terminated.

The SFF process used to construct the porous aluminum anode may be any one of the rapid prototyping techniques. These techniques include a direct write process, a selective laser sintering, a stereo-lithography process, a laser engineered net shaping, an inkjet process, and a three-dimensional printing. This list is not exhaustive and any suitable technique for SFF can be used.

Figure 4:
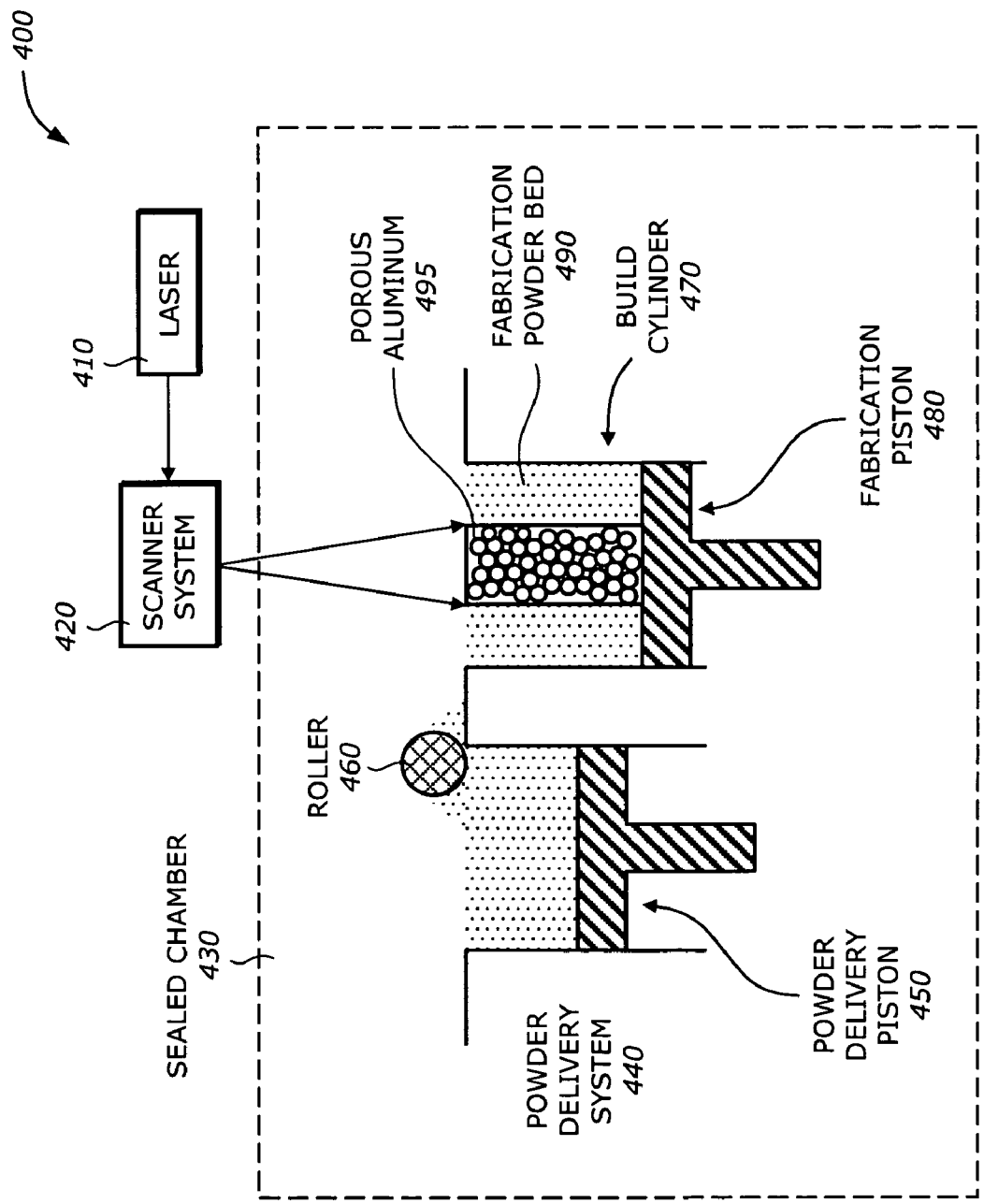
FIG. 4 is a diagram illustrating a selective laser sintering process to construct the porous aluminum according to one embodiment of the invention.

FIG. 4 is a diagram illustrating a selective laser sintering (SLI) system 400 to construct the porous aluminum according to one embodiment of the invention. The SLI system 400 includes a laser 410, a scanner 420, and a seal chamber 430. The sealed chamber 430 keeps environmental conditions in proper ranges such as temperature. The sealed chamber 430 includes a powder delivery system 440, a powder delivery piston 450, a roller 460, a build cylinder 470, a fabrication piston 480, a fabrication powder bed 490, and a porous aluminum anode being built 495.

The laser 410 generates a precise laser beam to the scanner 420. The scanner 420 guides the laser beam using computer aided design (CAD) and/or manufacturing (CAM) data to sinter the powder rolled by the roller from the powder delivery system 440 to the fabrication powder bed 490. The powder delivery piston 450 moves upward incrementally to supply the powder for the process. The fabrication piston 480 moves downward and/or upward as the porous aluminum is being fabricated. Since the aluminum powder 495 is sintered, as opposed to melted, it remains porous.

The porosity of the aluminum anode 495 can be controlled by adjusting the control parameters in the process. These control parameters include at least a build-up rate, a powder particle size, a powder composition, a laser beam intensity, a post build-up sintering, and a binder composition. Adjustment of these control parameters allows control of the number, shape, and size of the pores. The final porous aluminum anode is then used for capacitor fabrication.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
constructing a porous aluminum anode having a porous volume for use in a capacitor by a solid freeform fabrication (SFF) process, the porous aluminum anode having a plurality of pores, each of the plurality of pores having a pore size, constructing comprising
sintering aluminum powder to form the porous aluminum anode using a guided laser beam;
infiltrating an electrolyte in the plurality of pores; and
forming an oxide layer on the porous aluminum anode to provide a dielectric for the capacitor.

2. The method of claim 1 wherein constructing the porous aluminum anode using the SFF process comprises constructing the porous aluminum anode using one of a direct write process, a selective laser sintering, a stereo-lithography process, a laser engineered net shaping, an inkjet process, and a three-dimensional printing.

3. The method of claim 1 wherein the pore size is less than approximately 10 µm.

4. The method of claim 1 wherein constructing the porous aluminum anode using the SFF process comprises adjusting the pore size by adjusting a control parameter in the SFF process.

5. The method of claim 4 wherein the control parameter is one of a build-up rate, a powder particle size, a powder composition, a laser beam intensity, a post build-up sintering, and a binder composition.

6. A method comprising:
constructing a porous aluminum anode having a porous volume for use in a capacitor, the porous aluminum anode having a plurality of pores, each of the plurality of pores having a pore size, constructing comprising:
generating a laser beam to a scanner, guiding the laser beam using computer aided design (CAD) or manufacturing (CAM) data, and
sintering aluminum powder to form the porous aluminum anode using the guided laser beam;
infiltrating an electrolyte in the plurality of pores; and
forming an oxide layer on the porous aluminum anode to provide a dielectric for the capacitor.

7. The method of claim 6 wherein constructing further comprises:
adjusting porosity of the porous aluminum anode.

8. The method of claim 7 wherein adjusting the porosity comprises:
adjusting at least one of control parameters including a build-up rate, a powder particle size, a powder composition, a laser beam intensity, a post build-up sintering, and a binder composition.

9. The method of claim 6 wherein the pore size is less than approximately 10 μm.

* * * * *